(12) United States Patent
Zhou et al.

(10) Patent No.: US 9,477,006 B2
(45) Date of Patent: Oct. 25, 2016

(54) PULSED NEUTRON WELL LOGGING METHOD FOR DETERMINING MULTIPLE FORMATION PARAMETERS

(71) Applicant: Schlumberger Technology Corporation, Sugar Land, TX (US)

(72) Inventors: Tong Zhou, Sugar Land, TX (US); David Alan Rose, Sugar Land, TX (US); Sicco Beekman, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/325,234

(22) Filed: Jul. 7, 2014

(65) Prior Publication Data

US 2016/0003969 A1    Jan. 7, 2016

(51) Int. Cl.
   *G01V 5/08*   (2006.01)
   *G01V 5/10*   (2006.01)
   *G01V 5/12*   (2006.01)

(52) U.S. Cl.
   CPC ............. *G01V 5/102* (2013.01); *G01V 5/101* (2013.01); *G01V 5/10* (2013.01); *G01V 5/125* (2013.01)

(58) Field of Classification Search
   CPC .......... G01V 5/125; G01V 5/04; G01V 5/10; G01V 5/102; G01V 5/108
   See application file for complete search history.

(56) References Cited

U.S. PATENT DOCUMENTS

| 5,699,246 A | 12/1997 | Plasek et al. |
| 8,847,149 B2 * | 9/2014 | Jacobson et al. ......... 250/269.8 |
| 2002/0036260 A1 * | 3/2002 | Adolph ..................... 250/269.1 |
| 2012/0197529 A1 * | 8/2012 | Stephenson et al. ............ 702/8 |
| 2013/0062057 A1 * | 3/2013 | Smith, Jr. .................. 166/254.2 |

FOREIGN PATENT DOCUMENTS

| EP | 0145172 A1 | 6/1985 |
| EP | 2107396 A1 | 10/2009 |
| WO | 2012064797 A2 | 5/2012 |

OTHER PUBLICATIONS

U.S. Appl. No. 14/279,843, filed May 16, 2014.
Examination Report issued in related GB application GB1511891.2 on Dec. 21, 2015, 8 pages.

* cited by examiner

*Primary Examiner* — David J Makiya
*Assistant Examiner* — Kenneth J Malkowski
(74) *Attorney, Agent, or Firm* — Michael Dae; David G. Matthews

(57) ABSTRACT

A method for well logging includes emitting a plurality of bursts of high energy neutrons into a wellbore and formations surrounding the wellbore. During and for a selected duration after at least one of the plurality of bursts, gamma rays are detected at at least one location spaced apart from the emitting and characterizing an energy of the detected gamma rays. After the last burst, gamma rays are detected and energy spectrum and rates of detection with respect to time thereof are determined. The foregoing is repeated for a selected number of times. After the selected number of times background gamma rays are measured. At least one of the numbers of detected gamma rays during a selected time interval and an energy spectrum of the detected gamma rays during the selected time interval is used to determine selected formation properties.

17 Claims, 2 Drawing Sheets

PULSED NEUTRON WELL LOGGING METHOD FOR DETERMINING MULTIPLE FORMATION PARAMETERS

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND

This disclosure is related to the field of pulsed neutron well logging instruments. More specifically, the disclosure relates to methods for operating a pulsed neutron generator and obtaining certain measurements from a plurality of spaced apart, gamma ray spectroscopy detectors so that a plurality of different neutron related parameters of subsurface formations may be obtained while moving the well logging instrument through a selected set of formations only once.

A pulsed neutron well logging instrument can detect/measure neutron-induced gamma rays as function of time or energy. Based mainly on the time spectra data, one can obtain a neutron porosity measurement, a thermal neutron decay time or capture cross section measurement (SIGMA), and an inelastic measurement which is sensitive to gas-filled porosity. Based mainly on the energy spectra data, one can obtain spectroscopy measurements to obtain yields of certain chemical elements in formations surrounding a wellbore. All the measurements based on either time and/or energy spectra can be obtained in the same logging pass. The three neutron measurements based on the time spectra data often have lithology effects, while the spectroscopy can provide an accurate lithology measurement.

DETAILED DESCRIPTION

Figure 1:
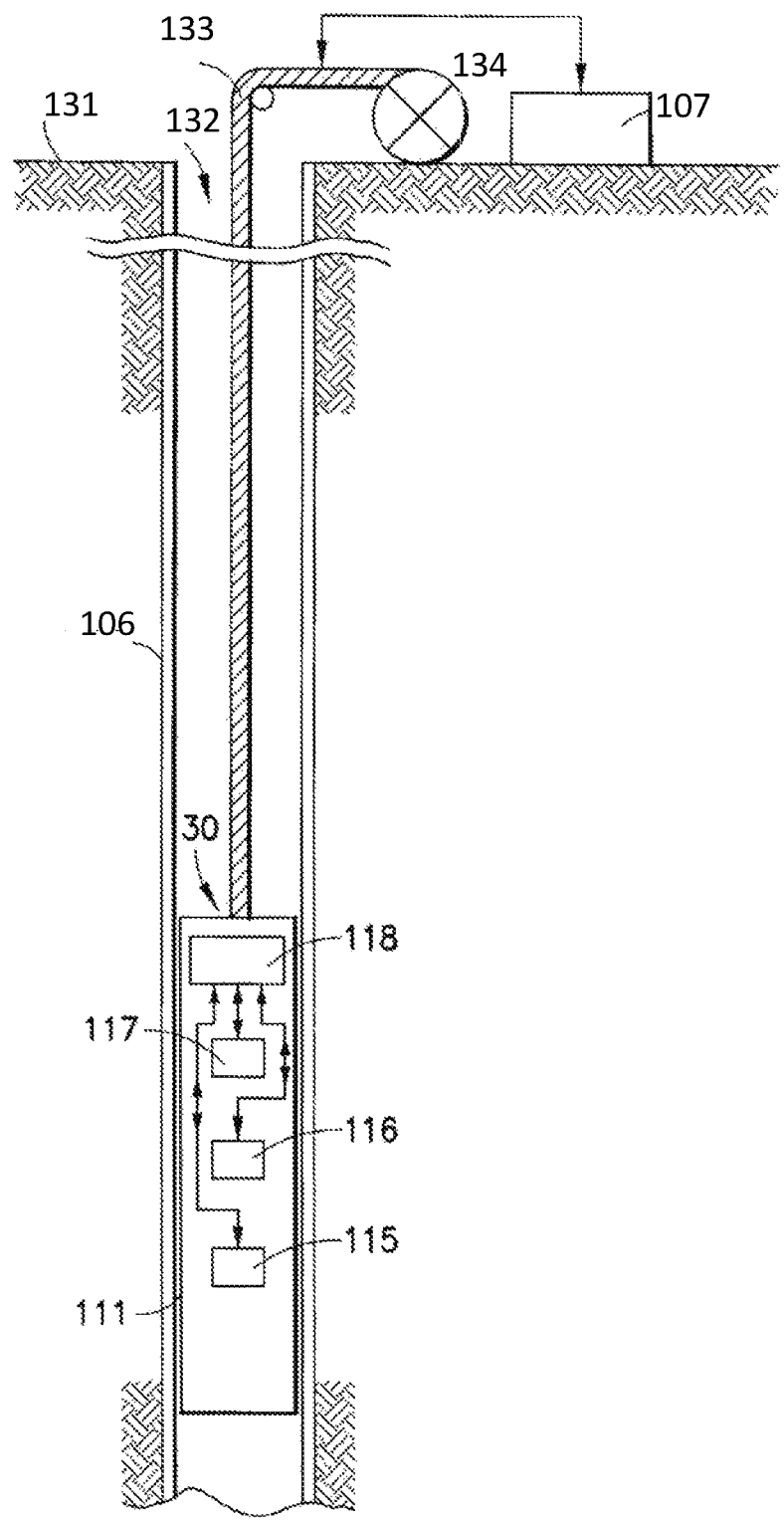
FIG. 1 shows an example pulsed neutron well logging instrument deployed in a wellbore.

FIG. 1 shows an example apparatus for evaluating subsurface formations 131 traversed by a wellbore 132. The present example wellbore may include a liner or casing 106 that may be evaluated using measurements made by a well logging instrument explained further below. A pulsed neutron well logging instrument 30 may be suspended in and moved along the interior of the wellbore 32 on an armored electrical cable 133, the length of which substantially determines the relative depth of the instrument 30. As is known in the art, this type of instrument can also operate in a well having tubing inserted inside the casing 106 or liner. The tubing is omitted from FIG. 1 for clarity of the illustration. The length of cable 133 may be controlled by suitable means at the surface such as a drum and winch mechanism 134. The depth of the instrument 30 within the wellbore 132 may be measured by encoders in an associated sheave wheel 133, wherein the double-headed arrow represents communication of the depth level information to the surface equipment. Surface equipment, represented at 107, may be of any type known in the art, and may include a processor subsystem and recorder (not shown separately), and communicates with the well logging instrument 30. It will be understood that certain signal processing may be performed in the well logging instrument 30 and/or at the surface, and that some of the processing may be performed at a remote location. Although the instrument 30 is shown as a single body, the instrument 30 may alternatively comprise separate components such as a cartridge, sonde or skid, and the well logging instrument 30 may be combinable with other well logging instrument. The pulsed neutron well logging instrument 30 may, in a form hereof, be of a general type described for example, in U.S. Pat. No. 5,699,246, but the foregoing example of an instrument is not a limitation on the scope of the present disclosure. The instrument 30 may include a housing 111 in the shape of a cylindrical sleeve, which is capable, for example, of running in open wellbore, cased wellbore or through a production tubing (not shown as explained above). Although not illustrated in FIG. 1, the well logging instrument 30 may also have an eccentering device, for example a bow spring, for urging the instrument 30 against the wall of the wellbore casing 106. At least one pulsed neutron generator (PNG) 115 may be mounted in the housing 111 with a near-spaced radiation detector 116 and a far-spaced radiation detector 117 mounted longitudinally above the PNG 115, each at a separate axial distance therefrom. One or more further detectors (not shown) may also be provided, it being understood that when the near and far detectors are referenced, use of further detectors can, whenever suitable, be included as well. Acquisition, control, and telemetry electronics 118 serves, among other functions, to control the timing of burst cycles of the PNG 115, the timing of detection time gates for the near 116 and far 117 radiation detectors and to telemeter count rate and other data using the cable 133 and surface telemetry circuitry, which can be part of the surface instrumentation 107. The surface processor of surface instrumentation 107 can, for example, receive detected neutron counts, detected gamma rays and/or gamma ray spectral data from near and far radiation detectors 116 and 117. The signals, whether raw detector measurements and/or processed data may be recorded as a "log" representing measured parameters with respect to depth or time on, for example, a recorder in the surface instrumentation 107. The radiation detectors 116. 117 may include scintillation counters, which may be used in connection with a spectral analyzer forming part of the electronics 118. While the example embodiment shown in FIG. 1 is explained in terms of conveying the well logging instrument through a wellbore on armored electrical cable, it should be clearly understood that any known conveyance known in the art, including, without limitation, slickline, coiled tubing or drill pipe (TLC or LWD) may be used to convey the logging instrument. Further, signals may be communicated to the surface using other known signal channels, for example and without limitation, fluid pressure modulation telemetry and optical fiber.

It will be appreciated by those skilled in the art that measurements are made by the well logging instrument typically by moving the instrument (as explained above) along the wellbore while recording and/or transmitting signals from the radiation detectors. A record with respect to depth and/or time of the radiation detector measurements may be made, and ultimately presented as a display of detector measurements and/or calculated formation parameters with respect to depth (axial position) in the wellbore. In the present disclosure, certain formation parameters to be described in more detail below may be determined with only one set of detector measurements for each depth (or axial) interval along the wellbore.

Figure 3:
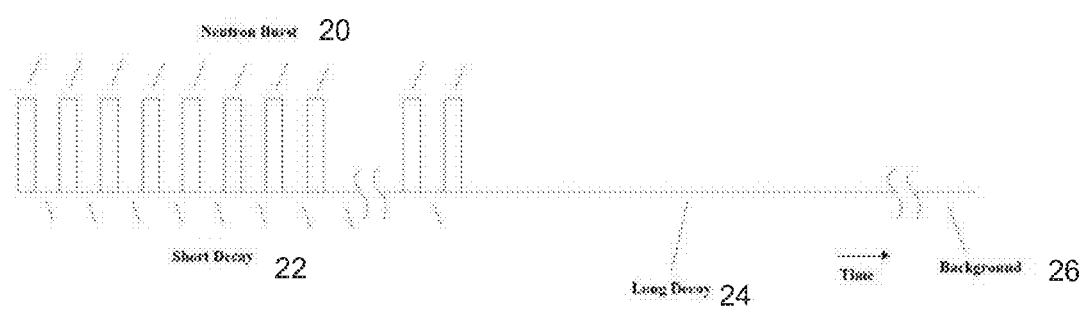
FIG. 3 shows an example neutron burst and gamma ray detection timing arrangement.

FIG. 3 shows an example timing diagram for operation of the pulsed neutron source and for detecting gamma rays at selected times and at each of the detectors in the instrument.

In one embodiment each of the neutron bursts is 20 micro-second long and each of the short decay is 30 microsecond long. There are totally 22 neutron bursts. The long decay is 1050 micro-second long. This entire measurement cycle, including the neutron bursts, short decay, and long decay, is repeated 100 times. Following the 100th repetition of the entire measurement cycle is a background radiation measurement window. It will be apparent to those skilled in the art that the foregoing example pattern of bursts may be substantially altered while still performing the same basic measurement functions as set forth herein. The foregoing example burst timing pattern is provided only as an example and is not intended to limit the scope of the present disclosure.

There are two or more gamma ray detectors used in the present embodiment. Each of them can measure gamma rays as a function of time or energy. The raw measurements of each detector may include a gamma ray count rate time spectrum. In some embodiments, the detecting may include a relatively low detection energy threshold (only counting as detected gamma rays pulse events with amplitude higher than the threshold and ignore what is likely to be electronic noise below the threshold), and several gamma ray count rate energy spectra within certain timing windows. In this example, one may measure four energy spectra from each detector, with timing windows of the neutron bursts, short decay, long decay, and background (as shown in FIG. 3).

Figure 2:
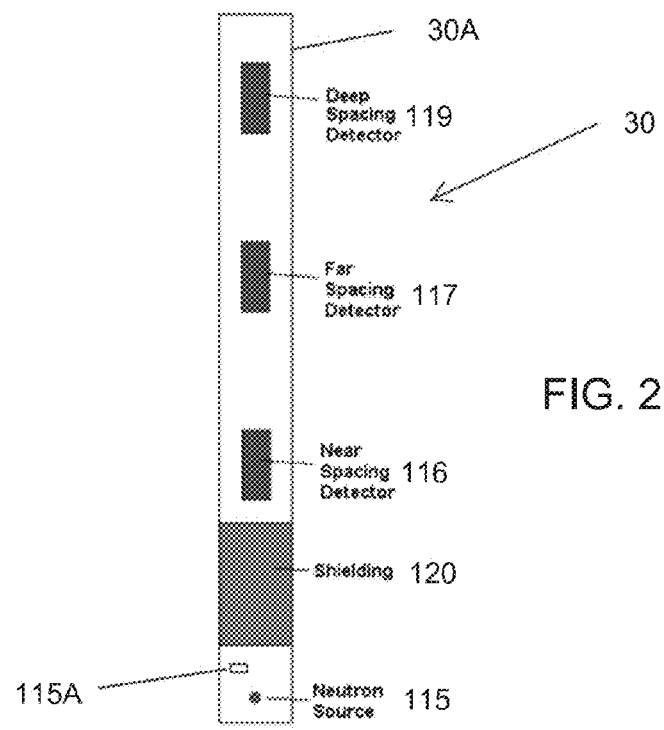
FIG. 2 shows another example of a pulsed neutron well logging instrument.

FIG. 2 shows an example multi-detector neutron logging instrument 30 in FIG. 1 in more detail. The neutron logging instrument 30 has a pulsed neutron source 115 and shielding 120 to substantially prevent neutrons from the source 115 from traveling directly to the detectors, explained below, along the interior of the instrument 30. All the components of the instrument 30 may be disposed in a sealed, pressure resistant housing 30A to enable the instrument 30 to move along the interior of a wellbore while preventing entry of fluid into the housing 30A. Three detectors 116, 117 119 each at successively longer distances along the housing 30A from the source are indicated, but for some applications a single detector or two detectors may suffice. The detectors may be gamma ray detectors, such as scintillation crystals of any known composition optically coupled to photon detector such as a photomultiplier, SiC detector or the like. The electronics (118 in FIG. 1) may include spectral analysis circuitry of any known type to count the numbers of gamma rays detected by each detector during selecting time intervals and having selected energy levels. As will be appreciated by those skilled in the art, the energy level of the detected gamma ray is generally related to the amount of the scintillation light emitted by the crystal in response to the detection, and a voltage pulse emitted by the photomultiplier may be related in amplitude to the intensity of the corresponding scintillation. The circuitry (118 in FIG. 1) may include a multichannel pulse height analyzer and a multichannel scaler to obtain counting rate information with respect to energy and time. The neutron source 115 is a pulsed neutron generator, as explained above. The neutron generator 115 can be any known type of pulsed neutron generator with controllable "neutron burst" timing (starting time of, and duration of each neutron "burst" emitted by the source), and preferably may be based on the deuterium-tritium reaction (with neutron output energy of 14.1 MeV). Other pulsed neutron sources using different reactions and having different energy output of the emitted neutrons may be used in other embodiments. For certain measurement techniques, the output of the neutron source 115 may be measured by neutron detector 115A, called a "source monitor", placed proximate the neutron source. A count rate from the source monitor 115A may be used to normalize certain count rate measurements made by any of the gamma ray detectors 116, 117, 119 for changes in neutron source output during operation of the instrument 30.

To better understand operation of a pulsed neutron well logging instrument according to the present disclosure, following is a description of the various neutron interactions that take place with media in the wellbore and in the formations surrounding the wellbore. When the source is operated, high energy neutrons are emitted into the wellbore and surrounding formations during each neutron burst. The high energy neutrons, which have an initial energy (of about 14.1 MeV in the present example), are slowed down quickly by formation materials so that after the neutron burst is terminated, there are very few neutrons with energy higher than about 1 MeV. All the neutrons present after the end of a burst are slowed down by various interactions with the atomic nuclei in the wellbore and formation materials to epi-thermal (100 keV to 1 eV) and eventually to thermal energy (~0.025 eV). The gamma ray detectors (116, 117, 119 in FIG. 2) do not detect neutrons directly but only detect gamma rays resulting from interaction of the neutrons emitted by the source with the media in the wellbore and surrounding formations. Neutrons may induce gamma rays through three types of interactions of interest in the present disclosure: (i) inelastic scattering (including fast neutron induced nuclear reactions); (ii) capture by a susceptible nucleus (e.g., those with a high neutron capture cross section such as chlorine), and by activation of susceptible atomic nuclei; and (iii) by activation.

Only neutrons with energy higher than about 1 MeV can induce gamma rays through inelastic scattering, thus, inelastic gamma rays are emitted substantially only during a neutron burst (i.e. during the operating periods of the neutron source). Both epi-thermal and thermal neutrons may be captured by susceptible formation or borehole materials (liquid, casing, cement, . . . ) and in response may induce capture gamma rays. Formation or borehole materials may also be activated by either high energy ($\geq 1$ MeV), epi-thermal or thermal neutrons and by reason of such activation may emit activation gamma rays at a certain time after activation. The intensity of activation gamma rays is typically a few orders of magnitude lower than that of inelastic or capture gamma rays.

In terms of timing, inelastic gamma rays are emitted substantially only during a neutron burst. Capture gamma rays may be emitted during part of the neutron burst, during a short or long time interval after the end of a neutron burst. At a sufficiently long time after the end of a neutron burst, thermal neutrons almost completely die away by capture (depending on the formation and borehole thermal neutron capture cross section) and only activation gamma rays may be detected. Activation gamma rays, plus any naturally emitted gamma rays (such as from elements in the formations such as, e.g., $^{40}K$, $^{232}Th$ and $^{238}U$) are collectively referred to as the "background."

From the count rate time and energy spectrum data of the detected gamma rays at each detector, one may calculate or estimate several formation properties. The measured gamma ray time spectra from two or more detectors (e.g., detectors 116 and 117 in FIG. 2) may provide quantitative gas indication, neutron porosity (or, alternatively, hydrogen index), and thermal neutron capture cross section measurements. The measured gamma ray energy spectra from one or more of the detectors can provide inelastic gamma ray and capture gamma ray spectroscopy measurements that may be used, for example to identify certain chemical elements in the formations.

Gas may be determined by determining the total gamma ray count rate during the neutron burst and during a short detection time interval following a neutron burst, performed at each detector. The numbers of detected inelastic gamma rays are an indirect measurement of the numbers of fast neutrons. After removing the detected capture gamma rays from the total gamma ray count rate during the neutron burst using the detected gamma ray count rate during the short time interval following the neutron burst, one can obtain a net inelastic gamma ray count rate from one or more of the detectors. Then one may calculate a net inelastic gamma ray count rate ratio between two gamma ray detectors, or the count rate from one gamma ray detector normalized by the neutron monitor to remove the PNG output variation.

Neutron porosity or hydrogen index may be measured by the total gamma ray count rate during the short detection interval after each burst and/or a long detection interval after a plurality of successive neutron bursts (explained with reference to FIG. 3). One may calculate a ratio between the count rates at two of the gamma ray detectors, or may use the count rate from at least one gamma ray detector normalized by the output of the neutron monitor. The total gamma ray count rate during the neutron burst may also be used to compensate certain measurements for effects of media in the wellbore so that properties of the surrounding formations may be measured accurately independent of such wellbore media.

SIGMA (Σ—macroscopic formation thermal neutron capture cross section) may be determined by determining an exponential count rate decay constant for the numbers of gamma rays detected with respect to time in long measurement intervals after the end of the final neutron burst in a measurement sequence that will be explained with respect to FIG. 3. At least one gamma ray detector count rate is needed. A count rate exponential count rate decay constant made during the short measurement intervals after each burst may be used to perform borehole/diffusion compensation. The exponential count rate decay constants made in the short or long measurement intervals from two or more gamma ray detectors located at different spacing from the source can also be used to perform borehole/diffusion compensation.

Inelastic gamma ray spectroscopy may be performed by analyzing the energy of the gamma rays detected by at least one detector during the neutron burst gate and the short measurement interval following each burst (FIG. 3). The capture gamma rays can be removed from the numbers of gamma rays detected during the neutron burst using the short measurement period gamma ray energy spectrum. The result is a net inelastic spectrum that contains gamma rays which may result from the presence of several elemental components (C, O, Si, Ca, Fe, . . . ), the inelastic gamma ray energy spectrum for which is unique to each element. Using the relative fractions of the inelastic gamma ray spectrum for each elemental spectrum, it is possible to determine the relative concentration of each element in the surrounding formations. Methods for such spectral analysis are well known in the art.

Capture gamma ray spectroscopy may be performed by determining the gamma ray energy spectra of gamma rays measured during the short time period following each burst and during the long detection time. A measured capture energy spectrum contains several unique components, each of which corresponds to presence of a particular element (e.g., and without limitation H, Si, Ca, Fe, Cl). Then one can determine the relative elemental concentration of each element using techniques known in the art.

FIG. 3 shows one possible neutron burst timing and gamma ray detection sequence that may be used in some embodiments. The timing sequence begins with a plurality of neutron bursts each being about 20 microseconds long. Each of the bursts 20 may be followed by a short measurement time window 22 that is about 30 microseconds long. In the present example, there may be 22 neutron bursts 20. After the last neutron burst 20 in the sequence, a long measurement timing window of 1050 microseconds duration takes place. The foregoing entire measurement cycle, including the neutron bursts, short measurement and long measurement times may be repeated 100 times. Following the one hundredth repetition of the foregoing cycle, a background radiation measurement time window may be provided. Such background measurement time window may have a length of 7 milliseconds. By repeating the measurement cycle for a selected number of times, statistical precision of the measurements may be improved such that instrument movement (well logging) speeds of more than 1000 feet per hour may be used while still obtaining sufficiently accurate and precise measurements of properties of the wellbore and the formation. Using neutron burst timing and gamma ray detection and analysis techniques according to the present disclosure, one may obtain a neutron porosity, thermal neutron capture cross section, inelastic gamma ray spectral elemental concentration and capture gamma ray spectral elemental concentration from measurements made only once for each depth interval along the wellbore.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for well logging, comprising:
   (a) emitting a plurality of bursts of high energy neutrons having a first selected duration into a wellbore and formations surrounding the wellbore;
   (b) during at least one of the plurality of bursts and for a second selected duration after the at least one of the plurality of bursts, detecting gamma rays at at least one location spaced apart from a position of the emitting and characterizing an energy of the detected gamma rays, and using numbers of the gamma rays detected after the at least one burst to correct numbers of gamma rays detected during the at least one burst for capture gamma ray effects;
   (c) after a last one of the plurality of neutron bursts, detecting gamma rays and detection rates thereof with respect to time at the at least one location and characterizing an energy thereof for at least part of a third selected duration;
   (d) repeating (a), (b) and (c) for a selected number of times;
   (e) after the selected number of times measuring gamma rays in a background time interval to provide correction for other measurements of gamma rays by removing background gamma radiation; and (f) using at least one of the numbers of detected gamma rays during a selected time interval, the rate of detection with respect to time and an energy spectrum of the detected gamma rays during the selected time interval to determine a neutron porosity, thermal neutron capture cross section, inelastic gamma ray spectral elemental concentration and capture gamma ray spectral elemental concentration by performing (a) through (e) only once for any selected depth interval along the wellbore.

2. The method of claim 1 further comprising correcting numbers of gamma rays detected at the at least one location for changes in numbers of neutrons emitted in each of the plurality of bursts.

3. The method of claim 2 wherein the correcting comprises measuring neutrons proximate the position of emitting.

4. The method of claim 1 further comprising detecting gamma rays at at least one additional location spaced at a different distance from the position of the emitting at the at least one location, and calculating at least one ratio of numbers of gamma rays detected at the at least one location and the at least one additional location.

5. The method of claim 1 wherein the neutrons emitted in each of the plurality of bursts has an initial energy of at least 1 million electron volts.

6. The method of claim 1 wherein the gamma rays detected during each neutron burst comprise gamma rays created through inelastic scattering of neutrons.

7. The method of claim 6 further comprising using gamma rays detected in each second selected duration after each burst to correct numbers of detected gamma rays detected in each burst for numbers of capture gamma rays detected during each burst.

8. The method of claim 1 wherein the at least one property comprises at least one of inelastic scattered gamma ray elemental yield, capture gamma ray spectroscopy elemental yield and formation thermal neutron capture cross section.

9. The method of claim 1 further comprising determining inelastic gas from gamma ray count rate measurements made during each burst and in for each second duration following each burst at at least one location spaced apart from the position of emitting the bursts.

10. A method for well logging, comprising:
(a) moving a well logging instrument along an interior of a wellbore traversing subsurface formations, the well logging instrument comprising a pulsed neutron generator and at least two gamma ray detectors each at a different axial spacing from the pulsed neutron generator;
(b) operating the pulsed neutron generator to emit a plurality of bursts of high energy neutrons having a first selected duration into the wellbore and the subsurface formations;
(c) during at least one of the plurality of neutron bursts and for a second selected duration after the at least one of the plurality of bursts, detecting gamma rays at at least one of the gamma ray detectors, using numbers of the gamma rays detected after the at least one burst to correct numbers of gamma rays detected during the at least one burst for capture gamma ray effects and characterizing an energy of the detected gamma rays;
(d) after a last one of the plurality of neutron bursts, detecting gamma rays and detection rates thereof with respect to time at the at least one of the gamma ray detectors and characterizing an energy thereof for at least part of third selected duration;
(e) repeating (b), (c) and (d) for a selected number of times;
(f) after the selected number of times measuring gamma rays in a background time interval using at least one of the gamma ray detectors to provide correction for other measurements of gamma rays by removing background gamma radiation; and
(g) using at least one of the numbers of detected gamma rays during a selected time interval, the rate of detection with respect to time and an energy spectrum of the detected gamma rays during the selected time interval to determine a neutron porosity, thermal neutron capture cross section, inelastic gamma ray spectral elemental yield and capture gamma ray spectral elemental yield by performing (b) through (f) while moving the well logging instrument through the wellbore only once.

11. The method of claim 10 further comprising correcting numbers of gamma rays detected by the at least a first gamma ray detector for changes in numbers of neutrons emitted in each of the plurality of bursts.

12. The method of claim 11 wherein the correcting comprises measuring neutrons proximate the position of emitting.

13. The method of claim 10 further comprising detecting gamma rays using the at least a second gamma ray detector, and calculating at least one ratio of numbers of gamma rays detected by the at least a first gamma ray detector and the at least a second gamma ray detector.

14. The method of claim 10 wherein the neutrons emitted in each of the plurality of bursts have an initial energy of at least 1 million electron volts.

15. The method of claim 10 wherein the gamma rays detected during each neutron burst comprise gamma rays from inelastic scattering of neutrons.

16. The method of claim 15 further comprising using gamma rays detected in each second selected duration after each burst to correct numbers of detected gamma rays detected during each burst for numbers of capture gamma rays detected during each burst.

17. The method of claim 10 further comprising determining inelastic gas from gamma ray count rate measurements made during each burst and in for each second duration following each burst by the at least one gamma ray detector.

* * * * *